United States Patent [19]
Kopernik

[11] 3,910,748
[45] Oct. 7, 1975

[54] PLASTIC MOLD CONSTRUCTION
[75] Inventor: Dror Kopernik, Chicago, Ill.
[73] Assignee: Turner Mfg. Co., Chicago, Ill.
[22] Filed: Apr. 15, 1974
[21] Appl. No.: 460,956

Related U.S. Application Data
[63] Continuation of Ser. No. 237,417, March 23, 1972, abandoned.

[52] U.S. Cl. ............... 425/444; 249/68; 249/107; 425/4; 425/247; 425/33; 425/58; 425/3
[51] Int. Cl.².. B29C 7/00; B29D 27/00; B29G 7/02
[58] Field of Search ............ 249/63, 64, 66, 67, 68, 249/105, 107, 205; 425/119, 242, 247, 252, 436, 444, 441, 450, 443, DIG. 33, DIG. 58, 4

[56] References Cited
UNITED STATES PATENTS

| | | | |
|---|---|---|---|
| 2,253,651 | 8/1941 | Ring | 249/66 X |
| 2,416,559 | 2/1947 | Wilson | 425/DIG. 33 |
| 2,613,395 | 10/1952 | Massler | 425/249 X |
| 2,711,558 | 6/1955 | Baker et al. | 425/DIG. 33 |
| 2,808,620 | 10/1957 | Schmid et al. | 249/59 X |
| 2,850,766 | 9/1958 | Press et al. | 249/68 X |
| 3,081,486 | 3/1963 | Skvorc | 425/436 X |
| 3,481,003 | 12/1969 | Taylor et al. | 425/119 |
| 3,551,957 | 1/1971 | Ramm | 425/119 X |
| 3,568,973 | 3/1971 | Rau et al. | 249/107 |
| 3,767,156 | 10/1973 | Sullivan et al. | 249/107 |

*Primary Examiner*—J. Howard Flint, Jr.
*Attorney, Agent, or Firm*—Norman Lettvin

[57] ABSTRACT

A mold for production of elongated board-like moldings that may be selectively provided with different ornamental surface designs is provided by a stationary match plate member and one or more movable plate members arranged for cooperation with the stationary match plate. One or more elongated ejector bars are slidably arranged to extend the entire length of the stationary match plate and when retracted within the stationary plate, an edge of said bar serves as part of the mold. Coordinated impact means dislodge the molded part from adherence to the ejector bars. When the board-like member is provided with an undercut, one or more rabbet mold parts is provided for selective but rigid securement during production, by simple clamp means, to the stationary match plate. A magnetic means provides for temporary securement of the mold parts to expedite set-up of the mold. Means are provided for maintaining the movable match plate and the associated rabbet mold parts together during storage.

9 Claims, 7 Drawing Figures

PLASTIC MOLD CONSTRUCTION

This is a continuation, of application Ser. No. 237,417, filed Mar. 23, 1972, now abandoned.

BACKGROUND OF THE INVENTION

This invention relates to an improved construction of a mold.

In the use of machines for repeated molding of articles in a production run, it is necessary to provide an automatic means for discharging the molded article so that the mold will then be prepared for a cycle. Heretofore, the discharge means is normally in the form of an ejector plate that requires extensive pinning and set-up to function properly and which is an expensive part of the mold.

One object of this invention is to provide a new and improved means for discharging a molded article from the mold therefor.

In copending application Ser. No. 460,971, filed Apr. 15, 1974, and in copending application Ser. No. 462,332, filed Apr. 19, 1974, there is disclosed an elongated board that is formed of a foamed thermoplastic material. Such boards are intended to serve as a substitute for shaped wood boards used in forming picture frames and the like, said frequently such boards have undercut portions extending along one or both of the longitudinal edges of the board. While it is known generally to use separable mold parts which when together form the desired cavity in which a complex part is to be molded, the providing of an adequate, effective and efficient mold for producing elongated parts such as disclosed in the co-pending application has posed many problems, namely the provision of simple but effective means for removing the molded part from the mold, and the provision of an economical and effective design of separable portions of the mold for elongated shapes of a complex cross-section.

Thus, a further object of this invention is to provide a new and improved separable mold construction for producing elongated board-like objects that may have a complex cross-section.

And another object of this invention is to provide a new and improved knock-out means for discharging articles from a mold of the type that is intended to mold articles of relatively long length and narrow width.

In the production of molded board-like articles it is desirable that the mold have the ability to produce boards of varying appearance. It is known to provide a different mold for each different specific design that has to be produced in an operation that requires production of a variety of ornamental designs. It is also known generally to attempt to reduce the cost of multiple molds utilizing at least one common feature by providing a common means that will function in substantially the same way as part of each separate mold combination. However, known prior attempts to utilize a common means as part of multiple molds has usually created a complex arrangement for interconnection of the separable mold parts, so that maximum economies of common usage have been difficult, if not impossible to attain.

Thus, still a further object of this invention is to provide a mold construction that is capable of achieving great economy in permitting of common usage of one or more mold parts with different combinations of other mold parts so as to produce substantially similar structure but of different ornamental designs.

And still a further object of this invention is to provide a mold construction that is characterized by simplicity and effectiveness of construction, by economy of set-up for effecting change of mold parts for producing different ornamental designs, and by efficiency and economy in use.

Further objects and advantages will become apparent to one skilled in the art as the following description of the invention proceeds.

SUMMARY OF THE INVENTION

By virtue of this invention there is provided a molding machine in which foamed thermoplastic articles, particularly elongated boards, can be produced at a high rate of production and in which the molds and associated pieces are substantially interchangeable and are quickly and easily assembled for manufacture. Elongated ejector bars are provided in association with a stationary match plate mold part for dislodging the molded board from the stationary match plate so that it can be removed from the machine. The molds include a movable castaluminum, cavity-defining mold plate which may carry a plurality of rabbet bars that are adapted to be releasably secured to the match plate to form the undercut portions of the molding. The rabbet bars are initially carried by the cast-aluminum cavity plate by a guide pin and aperture arrangement and are arranged to be releasably secured, first magnetically for quick set-up, and then with clamps to the match plate so that during molding the rabbet bars are secured to the match plate but after the molding operations are completed they may be released from the match plate and re-positioned on the cavity plate for storage.

DESCRIPTION OF THE PREFERRED EMBODIMENT

Figure 1:
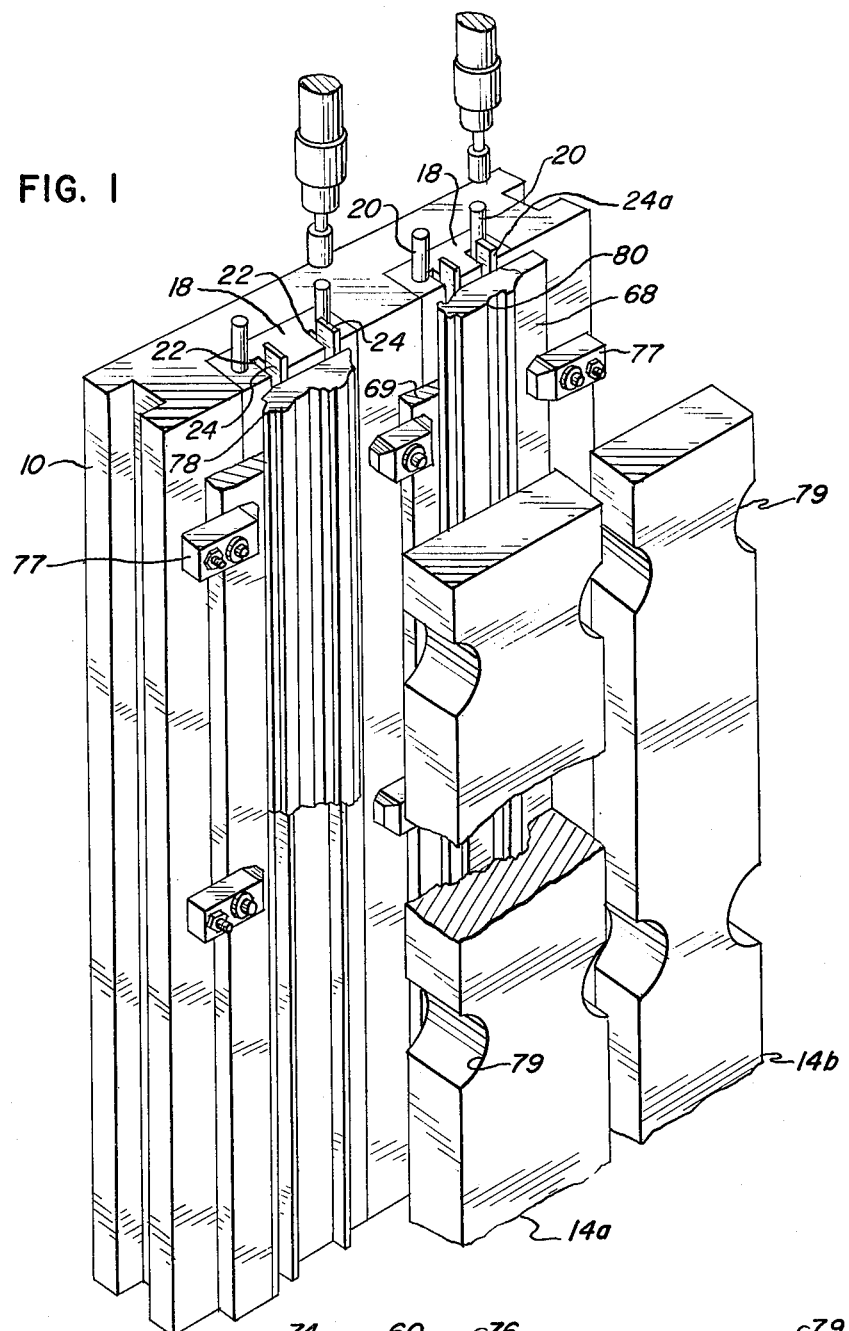
FIG. 1 is a diagrammatic perspective view of the mold assembly of this invention showing the stationary match plate, separable cavity-defining assemblies, rabbet bars and dislodgement air cylinders.

Referring now to the drawings, a stationary match plate 10 is shown mounted on a stationary platen 12, and a pair of movable, cavity-defining assemblies 14a and 14b are shown mounted by means of a mounting assembly 15 to a reciprocally movable platen 16 that, in the embodiment shown, is horizontally reciprocal. The platen 16 and thus the cavity-defining assemblies 14a and 14b are movable between a closed molding position as shown in full lines in FIGS. 2 and 5 and an open retracted position as shown in full lines in FIGS. 3 and 6 and illustrated in broken lines in FIG. 5.

Figure 6:
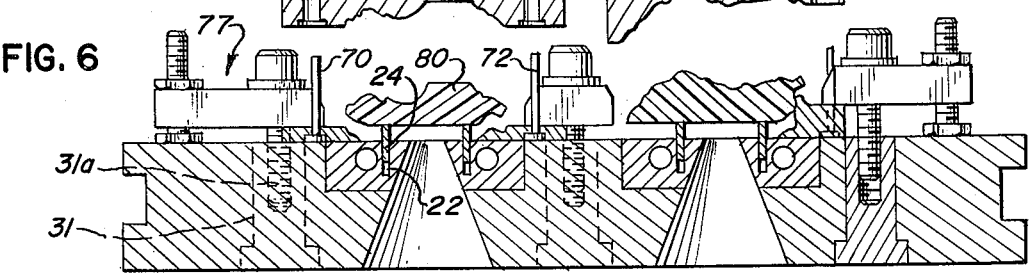
FIG. 6 is a horizontal, sectional view taken substantially along line 6—6 of FIG. 3 showing the mold assembly in the open position with the rabbet bars secured to the stationary match plate and the molded boards adhering to the extended ejector bars.

The match plate 10 is of aluminum having rigidly secured therein one or more elongated steel molding face plates 18 that serve as part of the means bounding a mold cavity. In the form shown, each steel plate has a flat face to help define the desired flat back side of the part being produced, but obviously the plate 18 may have a differently shaped face. The elongated plate 18 is provided therethrough with a pair of parallel, elongated tubes or passageways 20 for carrying cooling water through the plate 18. A pair of spaced, parallel and elongated ejector bar-receiving slots 22 of relatively narrow width and greater depth are provided along the entire length of each plate 18 and spaced inwardly of and adjacent the cooling water passageways 20. A pair of ejector bars 24 of generally rectangular cross-section are slidably positioned within the slots 22 for edgewise movement partially out of the slots 22 and away from the mold face of the match plate, as seen in FIG. 6. The ejector bars extend beyond the top and bottom ends of the elongated match plate 10 and when in the retracted or seated position in the slots 22 the exposed elongated edge 24a of each ejector bar is shaped to lie flush with the face of plate 18 and forms part of the molding surface. In the form shown, the exposed edge of bar 24 is flat, but it could be shaped to conform with mold requirements.

A plurality of frusto-conical injection nozzles 26 are spaced longitudinally of each plate 18 and extend both through the match plate 10 and the steel mold plate 18. The nozzles may be located approximately 12 inches apart for the entire length of the mold which may be of any desired length, such as 72 inches. The mold face plates 18 are rigidly held in position in the stationary match plate by longitudinally spaced screw bolts 28 which extend through the match plate to thread into the back side of plate 18, with the head of the bolt entering into recessed hole 30 that accommodates entry of a tool for cooperation with the head of bolt 28.

Figure 5:
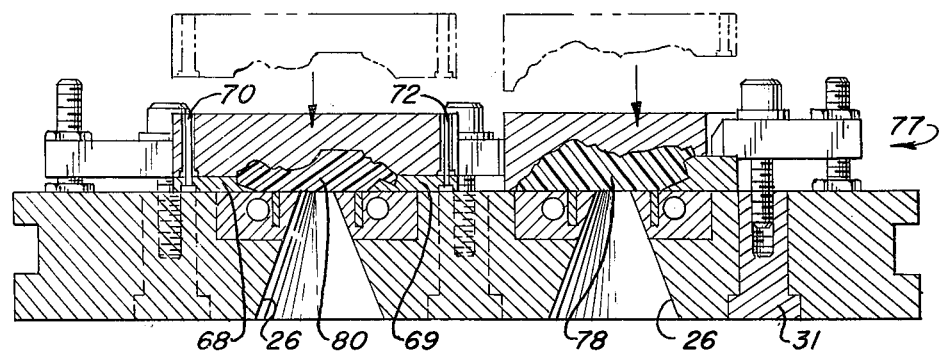
FIG. 5 is a sectional view taken substantially along line 5—5 of FIG. 2 showing the mold assembly in the closed position and samples of the molded boards formed therein and also showing, in broken lines, the cavity-defining assemblies in the mold-open position.
Figure 7:
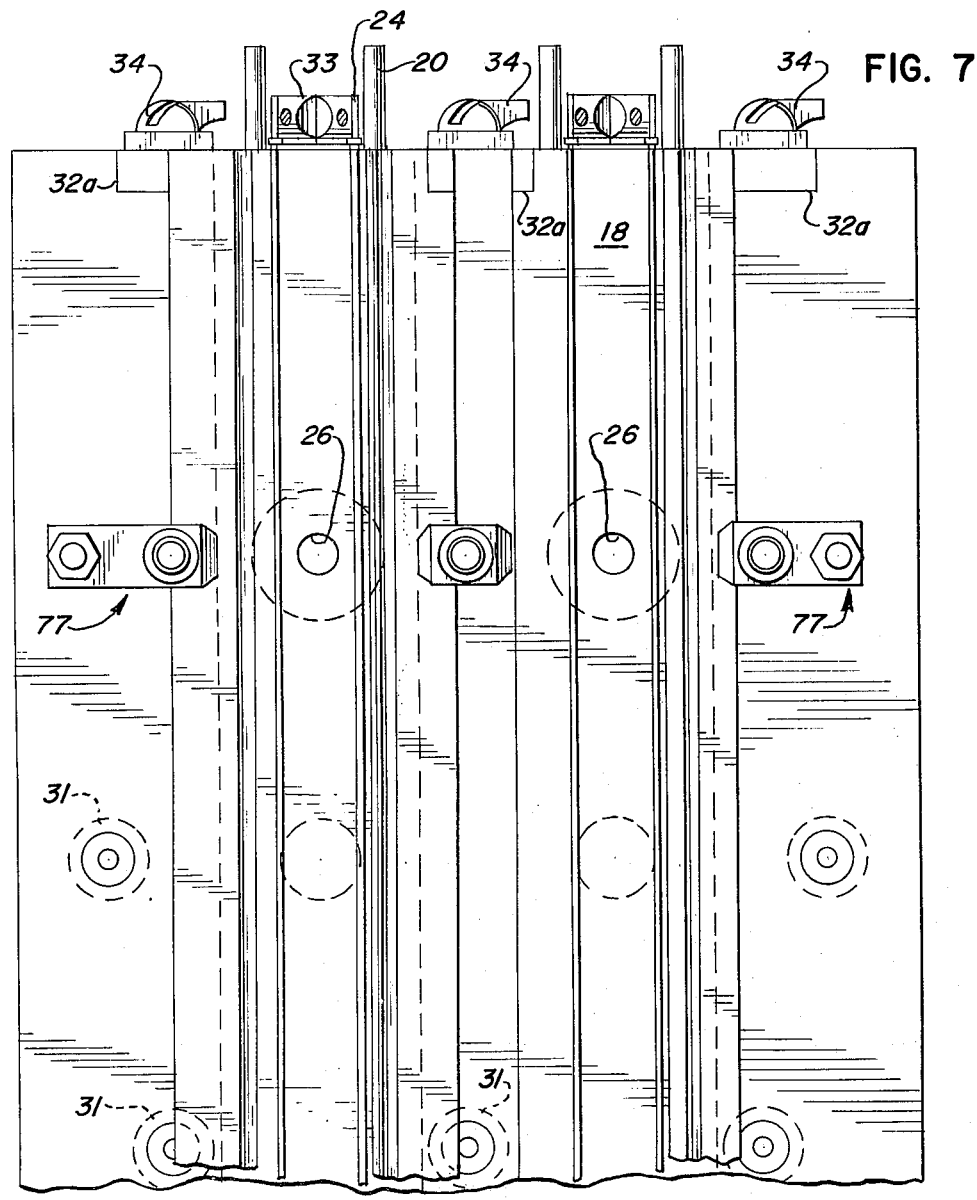
FIG. 7 is a fragmentary, elevational view taken substantially along line 7—7 of FIG. 2 and showing the molding face of the stationary match plate with the rabbet bars clamped thereto.

The match plate 10 provides thereon, adjacent each elongated, longitudinal edge of each mold plate 18, fastening means. Where two plates 18 are on plate 10, as seen in FIG. 5, there is a common region for fastening means between the two plates and adjacent one edge of each plate 18. The fastening means intermediate the end edges of plate 10 are in the well-known form of headed steel inserts 31 whose heads engage the back of plate 10 and whose stems are threaded to receive threaded fastening bolts 31a which operate to force clamping means toward the face of the plate 10. As seen in FIG. 7, the inserts 31 may be arranged in two or more longitudinal rows to provide for alternate securements as needed for different set-ups.

As an improved aid for temporarily locating elongated steel mold parts on plate 10 before securing the mold parts rigidly in position by use of clamps and bolts 31a, there is provided at each end edge of plate 10 a magnetic holder. The magnetic holder simply is a casing 32 that carries therein a permanent magnet of great magnetic holding power but pivotable about 90° so that when the magnet is aligned with area, or pad 32a, magnetic force grips any steel body that overlies area 32a, but when the magnet swings within casing 32 to its alternate position then there is no magnetic force applied at area 32a. A controller, or handle, 34 on casing 32 operates to move the magnet between operative and inoperative positions.

Figure 2:
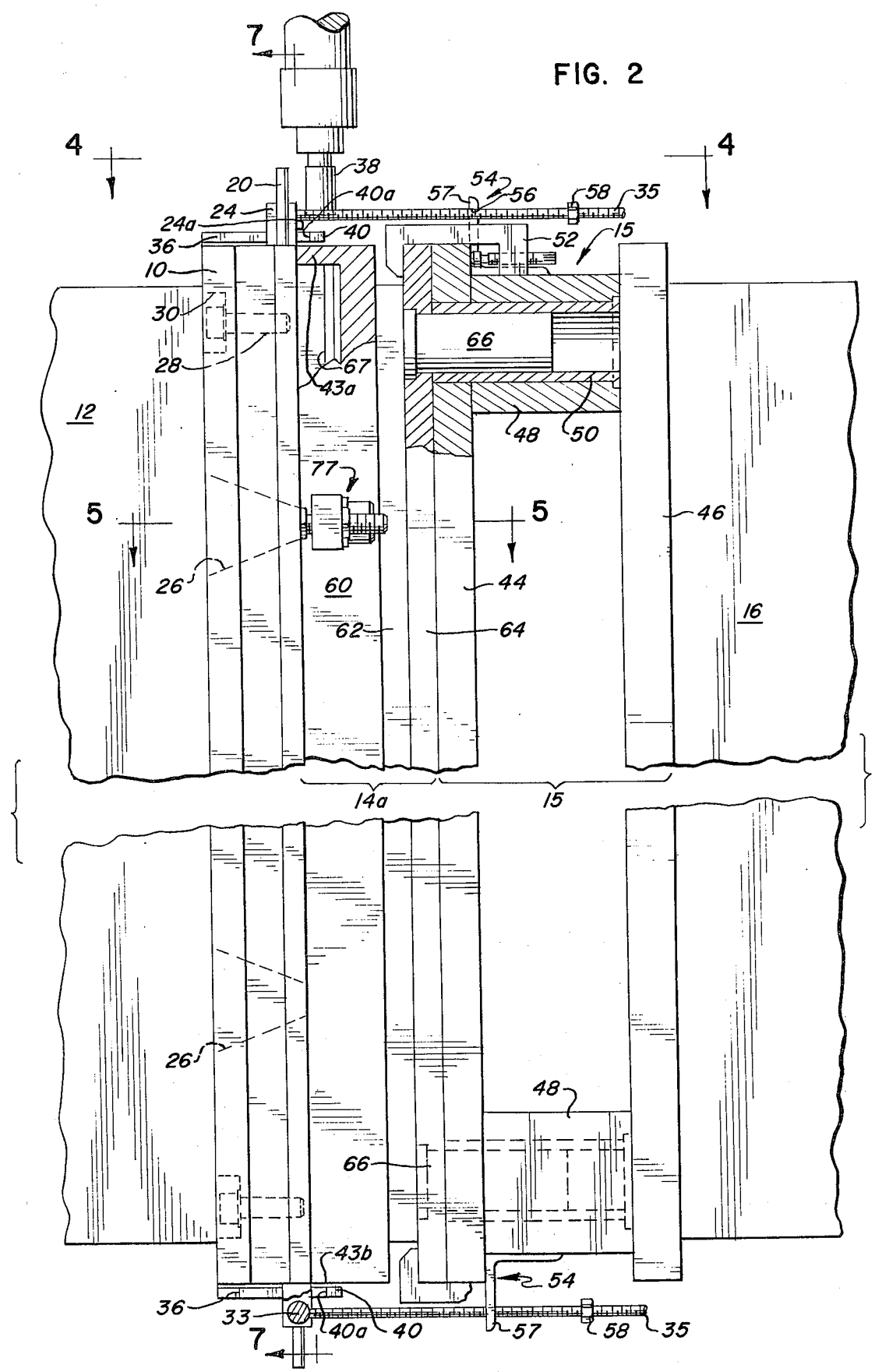
FIG. 2 is a fragmentary, side elevational view of the mold assembly in the closed molding position.
Figure 3:
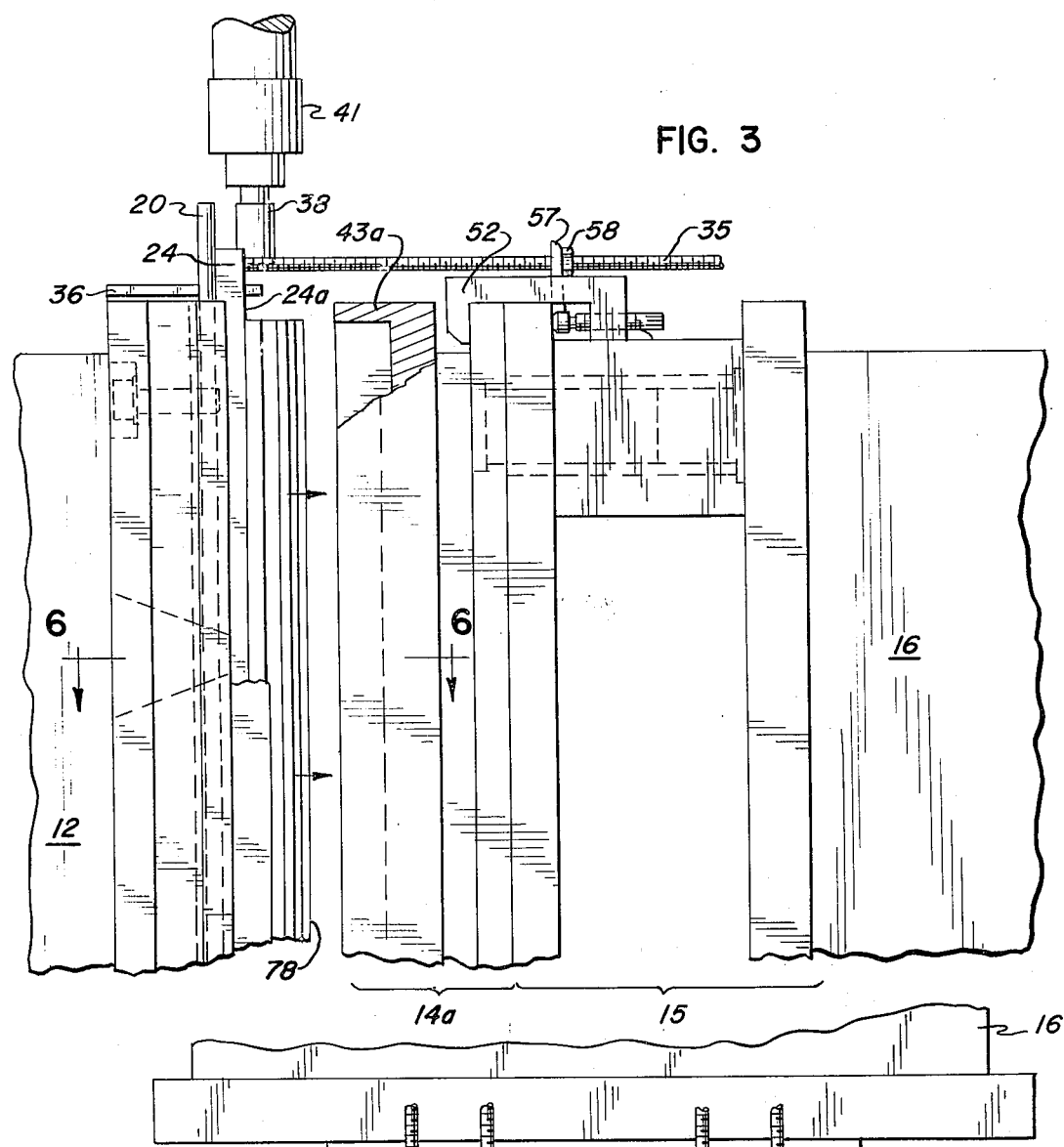
FIG. 3 is a fragmentary, side elevational view, similar to FIG. 2, showing the mold assembly in the open position with the molded board adhering to the extended ejector bar.
Figure 4:
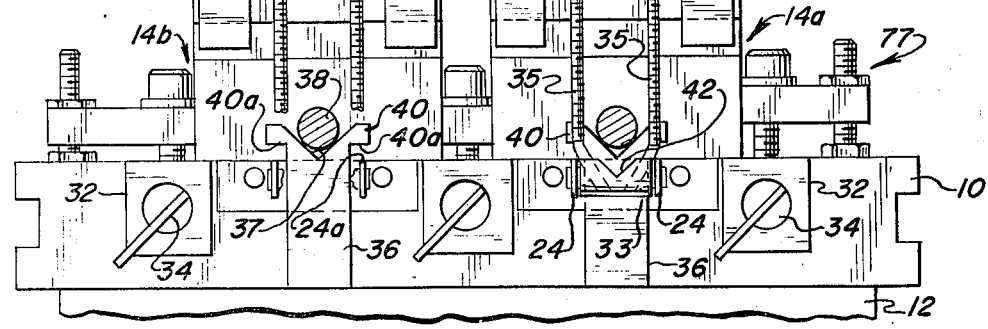
FIG. 4 is a fragmentary, top view taken substantially along line 4—4 of FIG. 2 showing the cavity-defining assemblies clamped to a movable mounting assembly and the ejector bar means.

Each pair of ejector bars 24 are ganged together by being connected at both their top and bottom ends by cross-gang blocks 33 as seen in FIGS. 2 and 7. These blocks each carry a pair of threaded ejector bar pulling rods 35 which by the action of the retractable platen 16 pull the ejector bars partially out of their slots 22 and away from the match plate. Ejector bar movement limiting plates 36 are fixedly secured to both the top and bottom of the match plate and have a pair of outwardly extending shoulders 40 having abutment edges 40a which engage the leading edges 24a of the ejector bars 24 as the bars are being pulled so as to prevent movement therepast. The forward end of the limiting plate has a V-shaped notch 37 (see FIG. 4) to provide clearance for an impact or "knock-off" head 38 which is extended downwardly from an air cylinder 41 to strike the end of the work piece and dislodge it from the ejector bars after the bars have been extended. The ejector bar cross-gang block 33 is also provided with a V-shaped notch 42 which is vertically aligned with the V-shaped notch in the limiting plate 36 when the ejector bars are fully extended against the edges 40 a of the movement limiting plate 36. The limiting plate and cross-gang block V-notches both provide the necessary clearance to permit the impact head to move downwardly and strike the molded part.

After the impact head has dislodged the work piece from the ejector bars, the platen 16 and thus the cavity-defining assemblies 14a and 14b are moved to the closed position and the top and bottom mold edges 43a and 43b engage the ejector bar leading edges 24a and move the bars 24 rearwardly into the seated position in slots 22 thus providing the flat molding face.

The cavity-defining assemblies 14a and 14b are mounted to the mounting asssembly 15 which includes a pair of spaced plates 44 and 46 held in fixed spatial relation by a plurality of interposed spacer members. The top and bottom members 48 are internally bored and have bushing members 50 secured therein, so that said members act as both spacers and bushings. The members 48 are located inwardly of the top and bottom of the plate members 44 and 46 so as to provide clearance for the clamps 52 which secure the cavity assemblies 14a and 14b to the mounting assembly 15.

Angle iron ejector bar puller members 54 generally are secured to the top and bottom of the mounting assembly 15 and are provided with guide holes 56 in the upright arms 57 thereof, which holes are aligned with the ejector bar puller rods 35 so that as the mounting assembly 15 is moved toward and away from the match plate the ejector bar puller rods are guided and slide within the guide holes 56. Ejector bar puller adjustment nuts 58, which threadedly engage puller rods 35 and are axially adjustable, engage the upright arm of the angle member 54 as the mounting assembly 15 is moved away from the match plate. When the upright arms 57 engage the nuts 58, both at the top and bottom of the mounting assembly, the ejector bars are pulled out of slots 22, the leading edges 24a are limited in their outermost travel by engagement with the edge 40a of the movement limiting plate 36. However, it is preferred that the travel of the ejector bars be limited to avoid such engagement and the limiting plate 36 acts only as a safety device. Axial adjustment of the nuts 58 on the rods 35 permits control of the distance through which the mounting assembly 15 moves before the ejector bars 24 are pulled from the match plate.

Each of the cavity-defining assemblies 14a and 14b include a cast-aluminum cavity plate 60, a recessed spacer portion 62 and a mounting plate 64. The mounting plate 64 is bored and countersunk so as to receive and secure the mounting pins 66 in position to be inserted into the bushing 50. In order to mount either of the assemblies 14a and 14b to the mounting assembly 15, the pins 66 are inserted into the bushings 50 which support and align the cavity assemblies 14a and 14b with respect thereto. The cavity assemblies 14a and 14b and the mounting assembly 15 are then secured together by C-type clamps 52 which engage the top and bottom ends of the mounting assembly plate 44 and cavity assembly mounting plate 64.

The entire molding cavity itself is defined by the cast-aluminum cavity 67 and the molding plates 18. In the event that there are undercuts or irregular shapes to the molded piece, the mold plate 60 is undercut or grooved between its top and bottom ends 43a and 43b so as to receive elongated steel rabbet bars 68 and 69 which define the remainder of the molding cavity. The rabbet bars have no undercut or re-entrant portions so as to permit easy removal of the molded board from the molding machine. Furthermore, since the bars form the undercut portions of the molding cavity, they do not interfere with the ejection of the molded board by the ejector bars. The rabbet bars 68 and 69 are supported by the mold plate 60 and a plurality of rabbet pins 70 and 72 which are secured at one end to the rabbet bars and which slide in guide apertures 74 and 76 in the mold plate 60.

When the cavity assemblies 14a and 14b are removed from storage for set-up, the rabbet bars are supported thereon by the pins 70 and 72. After the cavity assemblies 14a and 14b are mounted to the mounting assembly 15, it is advanced toward the match plate 10 until the mold plate 60 and rabbet bars engage the match plate. The magnetic holding means 32 are then actuated by rotating the operator handle 34 so as to grasp the rabbet bars and hold them in alignment against the match plate. The platen 16 is then retracted and the guide pins 70 and 72 may be sufficiently long so that the pins remain in the guide apertures, but even if the pins slide out of the apertures, the pins and apertures remain in alignment. Rabbet-bar hold-down clamps 77 are bolted with bolts 31a to the match plate inserts 31 along the length of each rabbet bar to secure the bar against the match plate. Clearance grooves 79 are provided on each side of the cavity assemblies 14a and 14b which are aligned with the inserts 31 and clamps 77 for permitting the assemblies 14a and 14b to close the mold cavity and clear the hold-down clamps 77. After the rabbet bars have been clamped in position, the magnets may be left in the actuated position and the molds are ready for operation.

The rabbet bars are released from the match plate 10 by the reverse operation wherein the clamps are released, the mold plate 60 is advanced against the match plate, the magnets are released and the rabbet bars then returned with the mold plate to the retracted position. The C-type clamps 52 are then released and the mold assemblies 14a and 14b removed from the mounting assembly 15 by sliding the pins 66 from the bushings 50.

In operation, after the rabbet bars 68 and 69 have been secured to the match plate 10, the platen 16 is advanced so that the mold plate 60 engages the match plate 10 and a molding cavity is thereby closed. Aliquot portions of appropriate amount of foamable polymeric material and blowing agent are then injected into the molding cavity through the nozzles 26 to form the molded boards 78 and 80. After cooling, the platen 16 is retracted, thereby retracting the mold plate 60 and as the platen retracts, the upright arm 57 of the ejector bar puller 54 engages the adjustment nut 58 and pulls it to a retracted position, thereby pulling the ejector bars 24 toward their extended position. The movement of the ejector bars, which dislodges the molded boards 78 and 80 from the match plate 10 and now carries the boards 78 and 80, is limited by engagement with the movement limiting shoulders 40.

After the platen stops, the air cylinder 41 then advances the impact head 38 which strikes the top end of the board 78 or 80, thereby dislodging the board from the ejector bars. The board or molding is then removed from the molding machine and the platen 16 advanced toward the match plate for another molding operation. The rabbet guide pins 70 and 72 slide in the guide apertures 74 and 76, thereby aliging the rabbet bars and mold plate 60 during each molding operation and assuring a uniformly shaped board. The top and bottom ends 43a and 43b of the mold plate 60 engage the leading edges 24a of the ejector bars at their top and bottom ends and push the bars 24 back into a seated position in the ejector bar slots 22. The molding cavity is thus closed and ready for the next molding operation.

In one embodiment, a machine could include eight molds, each approximately 72 inches long, which would be secured to a movable platen having a surface area of about 72 inches by 96 inches. Using this machine and based upon a four-minute cooling rate, a production rate of one frame per minute can be achieved.

It will be appreciated that numerous changes and modifications can be made to the embodiment shown herein without departing from the spirit and scope of this invention.

What is claimed and desired to be secured by Letters Patent of the United States is:

1. In a machine for molding an elongated board formed of foamed thermoplastic and having opposed elongated surfaces one of which is decorative, so as to be adapted for viewing, and wherein there are two platens which in one position enclose a molding space and in another position open the molding space to permit removal of the molded product, the improvement comprising a plurality of mold parts which when brought together define a mold cavity for molding the elongated board product having both said longitudinal surfaces thereon, one of the mold parts adjacent the surface opposite said ornamented surface providing nozzle means through which foamed thermoplastic material to be molded is to be introduced into the mold cavity, said one mold part having at least one elongated slot extending thereacross and located relative to the mold cavity so that portions of the mold cavity bridge the entire width of said elongated slot, an elongated ejector bar slidably positioned in the slot with one edge arranged so that the entire width of the bar serves as a surface-defining portion of said one mold part and as a mold part to which the surface opposite the ornamented surface of the product will adhere during production, the ends of said ejector bar extending laterally beyond the one mold part to provide means for actuating the bar within the slot to move the surface-defining edge thereof outwardly of the one mold part to effect release of the product from the remainder of the mold part while the product remains adhered to the bar edge across its entire width, and means positioned to move to impact against an end portion of the product adhered to the bar to cause the product to be dislodged from the bar.

2. A machine as in claim 1 wherein said one mold part is elongated and the nozzle means including a plurality of openings through said mold part spaced along the length thereof.

3. A machine as in claim 2 wherein the plurality of openings of the nozzle means are aligned, and there being two parallel slots in the one mold part located parallel to and spaced from the aligned plurality of openings, with two elongated ejector bars disposed one each in said parallel slots.

4. A machine as in claim 3 wherein the two parallel slots and ejector bars are located on opposite sides of the aligned plurality of openings.

5. A machine as in Claim 1 wherein one of said platens is stationary and carries the mold part which includes the ejector bar and the other platen is reciprocal with respect to the stationary mold, ejector-bar pulling-means mounted on said moveable platen and threaded rod means operatively associated with said ejector bars and said puller means, and threaded adjustment means on said rod means for operative association with said puller means, so that as said platen is moved, said puller means and said rod means pull the ejector bars outwardly from said one mold part holding the molded product in position spaced from the mold parts to permit the impact means to dislodge the product from the ejector bar.

6. In a machine for molding an elongated board formed of foamed thermoplastic and having opposed elongated surfaces one of which is decorative, so as to be adapted for viewing, and wherein there are two platens which in one position enclose a molding space and in another position open the molding space to permit removal of the molded product, the improvement comprising a plurality of mold parts which when brought together define an enlongated mold cavity for molding an elongated board product having udercut-type portions, a first of the mold parts being attached to a first platen and providing nozzle means positioned to face the surface opposite the decorative surface of the board and through which foamed thermoplastic material to be molded is to be introduced into the mold cavity, said one mold part having at least one elongated slot extending thereacross and located relative to the mold cavity so that portions of the mold cavity bridge the entire width of said elongated slot, an elongated ejector bar slidably positioned in the slot with one edge arranged so that the entire width of the bar serves as a surface-defining portion of said one mold part facing the interior of the mold cavity and as a mold part to which the product will adhere during production, the ends of said ejector bar extending laterally beyond the one mold part to provide means for actuating the bar within the slot to move the surface-defining edge thereof outwardly of the one mold part for releasing the product from the remainder of the mold part while the product remains adhered to the bar edge across its entire width, the plurality of mold parts including a movable second mold part adapted to be attached to and movable with a second platen and being operatively associated with said ejector bar, and at least one additional mold part in the form of rabbet bar means that cooperates with said first and second mold parts to define the mold cavity, said rabbet bar means being operatively associated with the second mold part when not in use but arranged to be selectively but fixedly secured to the first platen at a position spaced from the ejector bar and being of a size and shape selected to define the undercut-type portions of the molded product.

7. A machine as in claim 6 wherein means are provided which are cooperatively associated with said rabbet bar means and said movable second mold part for aligning said rabbet bar means with said movable second mold part and guiding the movable mold part as it moves between the open and closed positions and for guiding and maintaining said rabbet bar means in a storage position associated with said movable second mold part when said rabbet bar means are released from securement to said first platen.

8. A machine as in claim 7 wherein mounting means are provided for releasably securing said movable mold part to said second platen and for enabling said movable mold part and rabbet bar means to be removed from said machine as an assembly.

9. A machine as in claim 6 wherein the rabbet bar means are magnetically attractable, and magnet means are cooperatively associated with said first platen for attracting and temporarily holding said rabbet bar means against said first platen prior to effecting fixed connection of the rabbet bar means to the first platen.

* * * * *